United States Patent [19]

Movick

[11] Patent Number: 4,671,117

[45] Date of Patent: Jun. 9, 1987

[54] APPARATUS FOR TRANSMITTING DATA FROM HIGH SPEED ROTORS

[75] Inventor: Wayne K. Movick, Jupiter, Fla.

[73] Assignee: The United States of America as represented by the Secretary of the Air Force, Washington, D.C.

[21] Appl. No.: 688,943

[22] Filed: Jan. 4, 1985

[51] Int. Cl.[4] ............................................. G01L 19/00
[52] U.S. Cl. ...................................................... 73/756
[58] Field of Search ............................ 73/756, 147, 116

[56] References Cited

U.S. PATENT DOCUMENTS 3,186,218  6/1965  Hollis ..................................... 73/116
3,686,514  8/1972  Dube et al. .......................... 310/232
4,300,078  11/1981  Pascal ..................................... 318/49

Primary Examiner—Donald O. Woodiel
Attorney, Agent, or Firm—Stanton E. Collier; Donald J. Singer

[57] ABSTRACT

An apparatus is disclosed for transmitting electric and pneumatic signals from a high speed rotating test item. All of the sensor wires having electric signals from strain and/or temperature sensors are converted to stationary wires by a slipring assembly. A pneumatic tube is selected for output by a multichannel pressure select valve. This selected pneumatic tube is passed through the slipring assembly to a stationary transducer that converts the pneumatic signal to an electric signal on a stationary wire.

1 Claim, 1 Drawing Figure

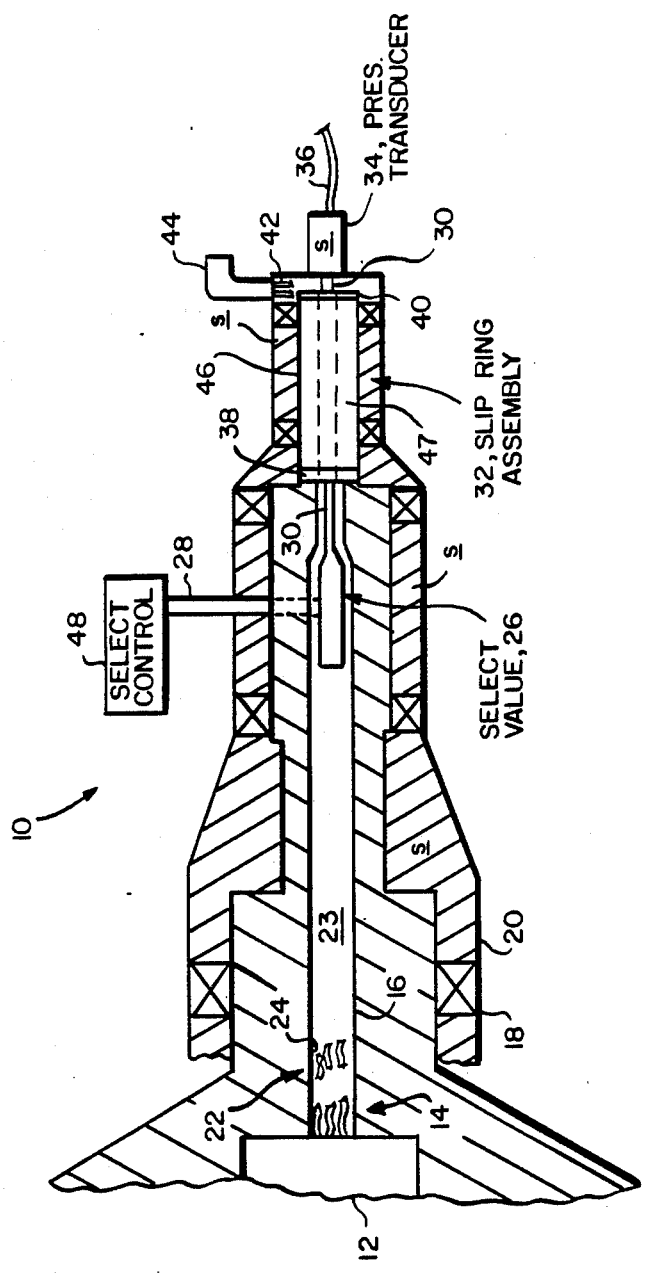

APPARATUS FOR TRANSMITTING DATA FROM HIGH SPEED ROTORS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to testing apparatus, and, in particular, to apparatus used to transmit both electrical and pressure signals from rotating test items.

In order to test such devices as jet turbine rotors in operation one must monitor a multitude of test points. Various parameters such as strain, pressure, and temperature are of concern and these are sensed by the devices that output either electrical or pressure signals. These signals must be removed from the rotating test item so that they can be recorded and monitored.

In the past electrical signals have been removed from the test item by use of a conventional slipring assembly which interconnects rotating wires to stationary wires. Pressure tubes from the test item, on the other hand, are reduced in number for output by the use of a select valve which selects one of the rotating pressure tubes for conversion to a stationary electrical circuit by a transducer. This single pressure tube is connected to a stationary transducer that then converts the pressure in the tube into an electrical pressure signal. In the past, only one type of signal, either electrical or pressure, could be removed from the rotating test item because the slipring assembly and the select valve were not easily connected onto the same test fixture. A further problem encountered was the placement of the air pressure transducer. The transducer, it was found, had to be stationary because of calibratin problems caused by rotation and also the increased temperature experienced when the transducer was mounted on the rotating test fixture.

These drawbacks motivated a search for an appratus wherein both the select valve and the slipring could both be mounted but the transducer could be stationary.

SUMMARY OF THE INVENTION

The instant invention sets forth an apparatus for transmitting data from high rotational speed test items.

A high speed rotational test item is mounted in a test fixture. The test item has mounted thereon a multitude of strain and temperature sensors, for example, that output emf signals on wires that are rotating also. Pressure sensor tubes are also mounted on the test item and are rotating. Both the electrical wires and the pressure tubes leave the rotating test item at a common area and travel along a rotating shaft of the test fixture. The pressure tubes enter a select valve which allows the selection of one pressure tube to be output. The output pressure tube, still rotating, enters and passes through a slipring assembly which converts all the rotating wires to stationary wires. After passing through the slipring assembly, the single output pressure tube enters a stationary transducer that converts the pressure inside the tube to an electrical signal for a wire. In the above apparatus both the electrical wires and one selected pressure tube, rotating on a shaft of a test fixture, are changed to stationary electrical wires for sending the appropriate signals.

It is therefore one object of the present invention to provide an apparatus that converts both rotating electrical wires and pressure tubes to stationary outputs from a high speed rotating test item.

Another object of the invention is to eliminate calibration problems associated with converting a rotating pressure tube signal to a stationary wire through a stationary transducer.

These and many other objects, features and advantages of the present invention will be readily apparent to one skilled in the pertinent art from the following detailed description of a preferred embodiment of the invention.

BRIEF DESCRIPTION OF THE DRAWING

The only FIGURE of the invention illustrates by schematic representation the apparatus used to convert rotating wires and tubes to stationary wires through a test fixture having a stationary pressure transducer and a slipring assembly.

DETAILED DESCRIPTION OF THE PREFERRED EMBODIMENT

Referring to the only FIGURE, a test fixture 10 is connected to a rotating test item 12 which is connected to a test fixture 10 in a conventional manner.

In order to test such devices as jet turbine rotors, etc. many sensors are placed about test item 12. For example, strain sensors can be attached to rotating test item 12. Temperature sensors can also be attached. Both strain and temperature sensors, not shown, are conventional and output emf signals on attached wires. In some applications up to 100 or more sensors can be attached to test item 12. Sensor wires 14 only partially shown, from these sensors enter a rotating shaft 16 having a cylindrical hole 24 therethrough. Shaft 16 is held in place by a multitude of bearings 18 such as bearing 18 mounted to an outer case 20 of test fixture 10. Stationary items are indicated by the letter "s" in the FIGURE.

Air pressure from sensors, not shown, on test item 12 is transmitted via rotatomg pressure tubes 22, being conventional and only partially shown that pass through hole 24. It is understood that both sensor wires 14 and pressure tubes 22 are mounted in a cylindrical hole 24 of shaft 16 in a manner required to hold them in place and in a balanced configuration.

Air pressure tubes 22 enter a pressure select valve 26 such as made by Scanivalve Corporation and described below. A pressure select control 48 connected to select valve 26 by pressure select signal circuit 28 is able to select one of the input pressure tubes 22 for output by select valve 26 to a rotating output pressure tube 30. Output pressure tube 30 passes directly through the center of a slipring assembly 32 and connects to a stationary pressure transducer 34 connected to case 20. Tube 30 can enter pressure transducer 34 through a stationary O-ring for sealing pressure. A pressure signal wire 36 transmits the electrical pressure signal to monitoring equipment, not shown.

Select valve 26 is necessary in order to measure pressure at a multitude of points on the test item 12 because only a single rotating tube 30 can be located in the center of both the rotating slip ring shaft 47 and stationary O-ring seal in pressure transducer 34. The series of tubes 22 are connected to ports, not shown, in the body of the selective valve 26. Selective valve 26 operates on these ports connected, one at a time, to tube 30 by a face plate with an appropriate passageway which rotates in steps to each port in sequence. Two of the ports are vented to a reference pressure to provide data identification. The plate is fitted with an O-ring seal at the tube 30 and the ports in the valve body are fitted with O-ring seals which contact the face plate. The face plate is coupled to a double acting piston which rotates as it is moved from one end of a cylinder to the other by externally supplied air pressure. Each end of the piston has a set of angled teeth which contact matching teeth in each end of the cylinder. The number of teeth in each set is one half the number of ports in the valve body. The tooth sets on the piston are in angular alignment while the tooth sets in the cylinder have a slight angular misalignment. The angular misalignment of tooth sets in the cylinder results in misalignment of piston teeth to cylinder teeth causing the piston to rotate one tooth with each movement of the piston from one end of the cylinder to the other end. Air pressure is channeled to the piston through holes in the rotating shaft 16 from two separate step pressure chambers in the case. Ring seals around the shaft are used to contain the step pressures. The select control 48 simply provides pressure to one chamber at a time causing the piston to travel back and forth thus rotating the select valve face plate from port to port.

Sensor wires 14 pass down hole 24 around select valve 26 and connect to slipring assembly 32. An input connector 38 connects rotating wires 14 to sliprings 46. An output connector 40 connects sliprings 46 in an appropriate manner to stationary sensor wires 42 that are connected to a standard electrical connector 44. As clearly seen, both sensor wires 42 and pressure signal wire 36 are stationary with respect to test item 12.

Clearly, many modificatons and variations of the present invention are possible in light of the above teachings and it is therefore understood, that within the inventive scope of the inventive concept, the invention may be practiced otherwise than specifically claimed.

What is claimed is:

1. An apparatus for transmitting both emf and pneumatic signals from a high speed rotating test item, said test item mounted in a test fixture, said apparatus comprising:

means for selectively connecting one of a plurality of rotating pressure tubes to a single rotating pressure. A tube, the pressure present in said one of said plurality being input into said single rotating pressure tube;

slipring means for converting a plurality of rotating sensor wires connected to said rotating test item to a plurality of stationary output wires having thereon said emf signals, said slipring means having therein a longitudinal void, said single rotating pressure tube for output passing through said void;

a pressure transducer, said pressure transducer being stationary, said pressure transducer having input said single rotating pressure tube and having output a stationary pressure sensor wire having thereon a pneumatic signal indicative of the pressure in said single rotating pressure tube;

a shaft connected to said test item and containing said means for selecively connecting and said slipring means fixedly mounted to said shaft rotatably secured within said test fixture, and a case, said case having said shaft rotatably secured thereon and said pressure transducer fixedly secured thereon, said case being stationary.

* * * * *